United States Patent
Welling et al.

[11] Patent Number: 5,871,251
[45] Date of Patent: Feb. 16, 1999

[54] VISOR DISPLAY

[75] Inventors: Thomas L. Welling; Michael J. Suman, both of Holland, Mich.

[73] Assignee: Prince Corporation, Holland, Mich.

[21] Appl. No.: 616,066

[22] Filed: Mar. 14, 1996

[51] Int. Cl.$^6$ .............................. B60R 7/08; F21V 33/00
[52] U.S. Cl. ........................ 296/97.5; 362/74; 362/144; 296/37.8
[58] Field of Search ................... 296/97.5, 37.8, 296/97.1; 362/74, 144, 142, 135

[56] References Cited

U.S. PATENT DOCUMENTS

| | | | |
|---|---|---|---|
| D. 294,495 | 3/1988 | Nissley | 296/97.5 X |
| D. 328,587 | 8/1992 | Arbisi . | |
| 4,588,267 | 5/1986 | Pastore . | |
| 4,630,904 | 12/1986 | Pastore . | |
| 4,652,982 | 3/1987 | Flowerday . | |
| 4,760,503 | 7/1988 | VandenBerge et al. . | |
| 4,807,093 | 2/1989 | Cisler . | |
| 4,870,676 | 9/1989 | Lewo . | |
| 4,953,305 | 9/1990 | VanLente et al. . | |
| 5,016,996 | 5/1991 | Ueno . | |
| 5,296,678 | 3/1994 | Schnorf | 296/97.5 X |
| 5,364,153 | 11/1994 | Vaxelaire | 296/97.5 |
| 5,415,554 | 5/1995 | Kempkers et al. . | |
| 5,428,513 | 6/1995 | Hiemstra et al. . | |
| 5,475,366 | 12/1995 | Van Lente et al. . | |
| 5,479,157 | 12/1995 | Suman et al. . | |
| 5,555,502 | 9/1996 | Opel . | |

FOREIGN PATENT DOCUMENTS

WO8202448  7/1982  European Pat. Off. .

*Primary Examiner*—Joseph D. Pape
*Attorney, Agent, or Firm*—Price, Heneveld, Cooper, DeWitt & Litton

[57] ABSTRACT

A visor display includes a the visor body having a window to which a display is movably mounted such that the display, when the visor is in one of a raised or lowered use position, is visible through the window and, when the visor is moved to the other of the raised or lowered positions, the display can be moved to be directly visible. In a preferred embodiment of the invention, the visor display includes a display housing movable into a storage pocket in the visor body and movable from a closed position where the display is aligned with a window formed through the visor body to an open position where the display is visible when the visor window is adjacent the vehicle roof. In the preferred embodiment of the invention, the visor window was formed in a vanity mirror in an area of the vanity mirror which is otherwise covered with a reflective material such that the display is viewed through the front surface of the mirror window. In another embodiment, the visor includes a housing for a display which provides a display surface extending to opposite sides of the visor to display information regardless of the visor position.

14 Claims, 5 Drawing Sheets

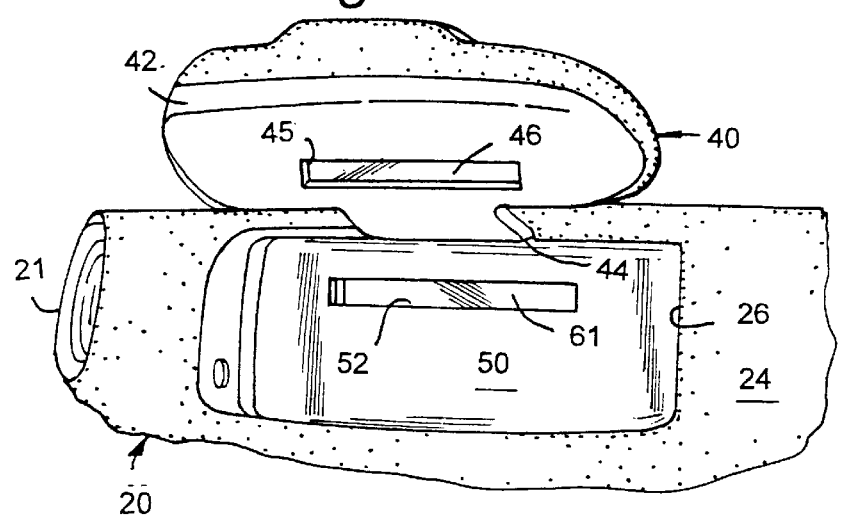
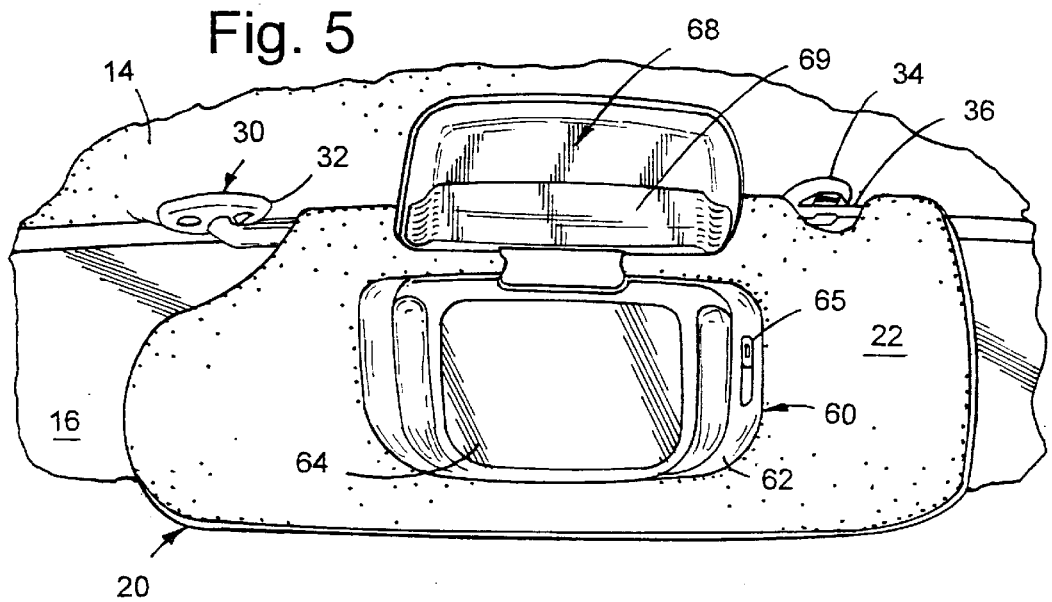
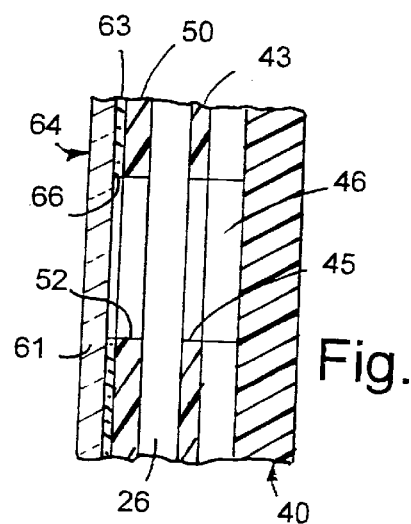

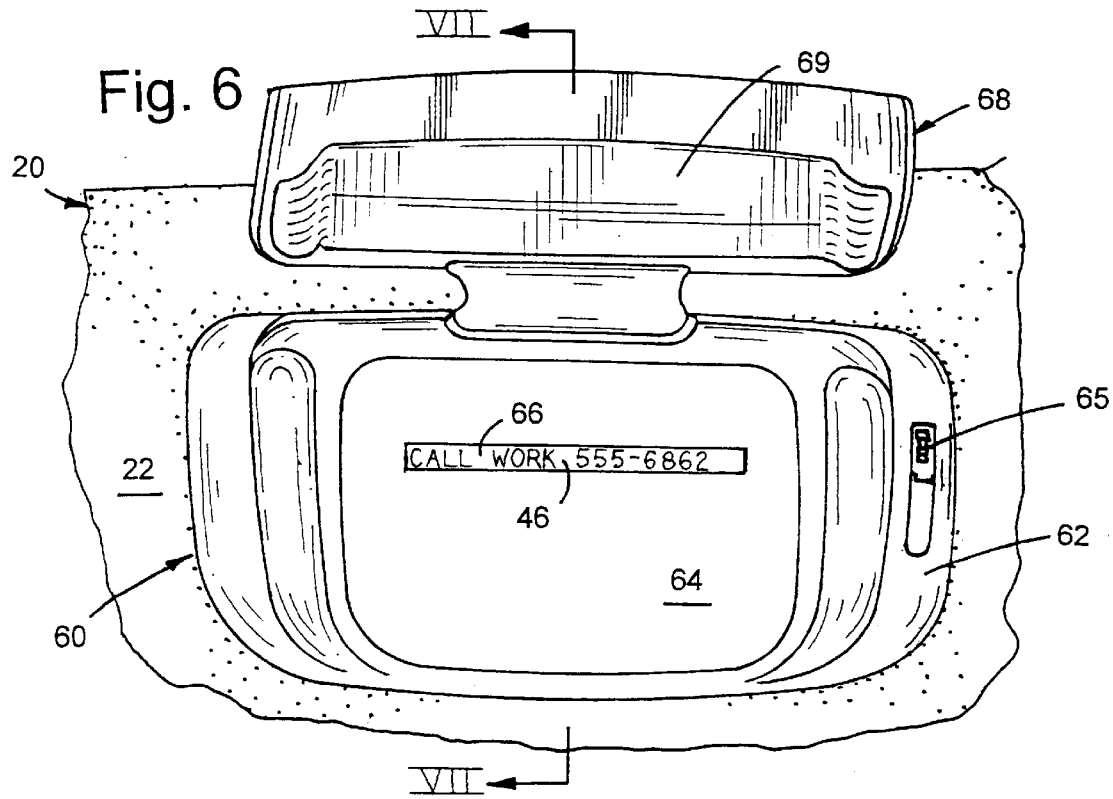
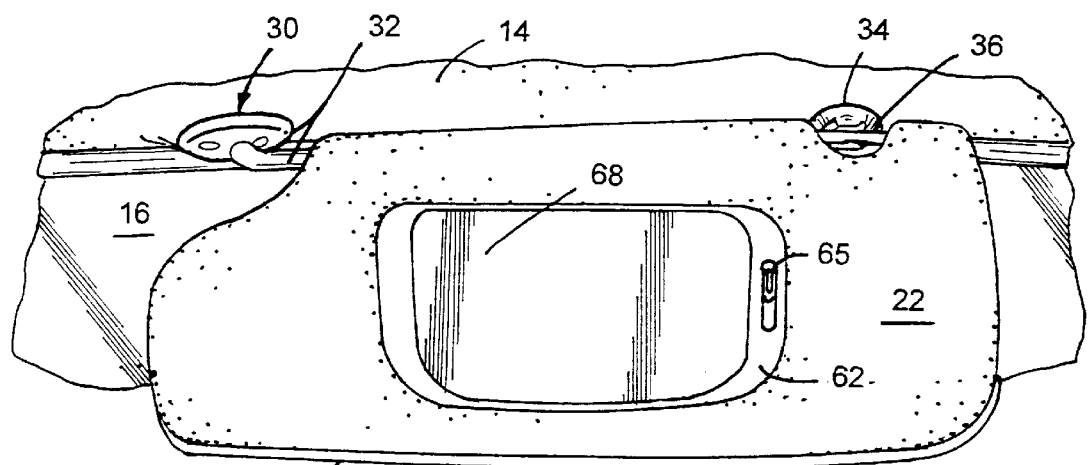
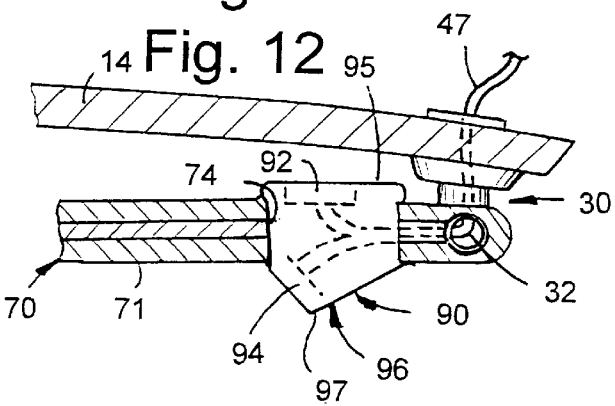

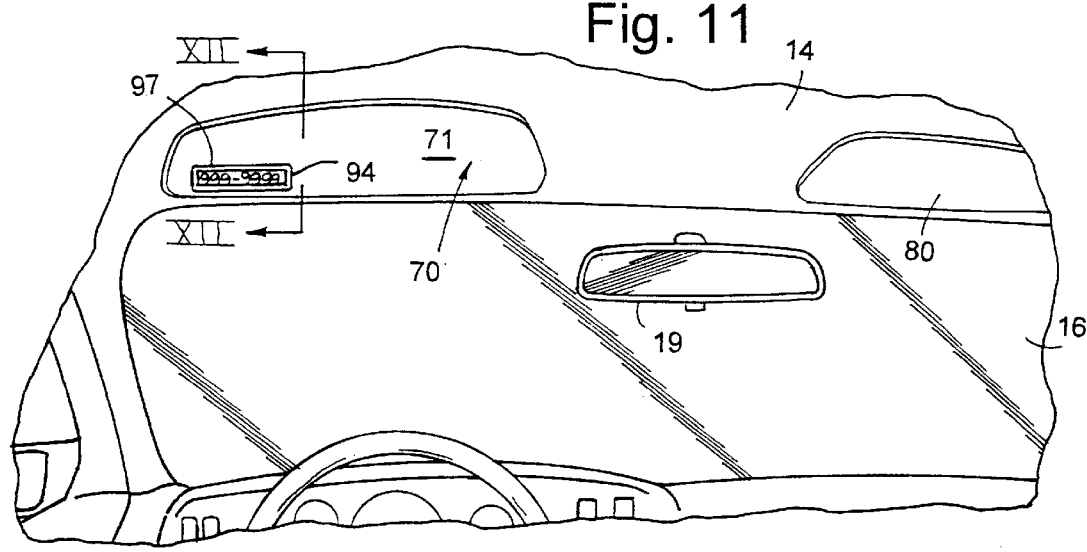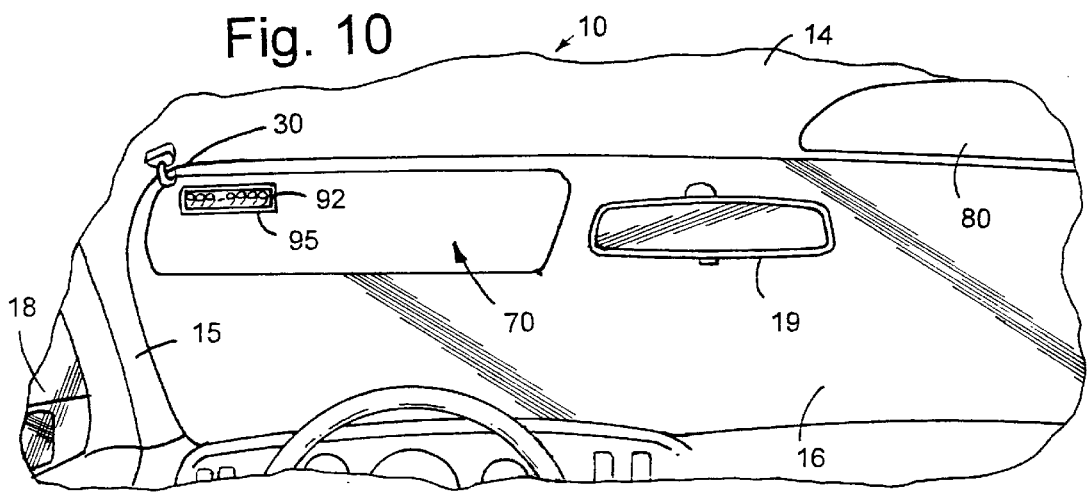

VISOR DISPLAY

BACKGROUND OF THE INVENTION

The present invention relates to a vehicle visor and one with an information display which is visible from opposite sides of the visor.

Displays of vehicle parameter information and other information such as compass heading and the like have become commonplace with a variety of locations being employed for such displays, typically within the instrument panel of the vehicle itself. Displays have also been located in the A-pillar of a vehicle as, for example, disclosed in U.S. Pat. No. 5,415,554 and in rearview mirrors as, for example, disclosed in U.S. Pat. No. 5,475,366. Such displays usually provide the vehicle operator with information desired for the operation of the vehicle. An incidental display is employed on a visor-mounted telephone as disclosed in U.S. Pat. No. 4,870,676, which shows a telephone and its display viewable only when the visor is in a lowered position for use of the telephone.

It has been discovered that a visor provides a desirable location for the mounting of a trainable transmitter which is commercially available in many vehicles now on the market. Visors also provide a convenient location for the mounting of illuminated vanity mirrors of the type disclosed in U.S. Pat. No. 4,760,503.

SUMMARY OF THE PRESENT INVENTION

In order to more fully utilize the beneficial location of the visor as well as its ability to move from a raised stored position to a lowered use position, the present invention utilizes the visor as a mounting location for a unique display for information such as paging messages, compass and temperature information, vehicle operating parameter information and the like. It is desirable, however, to have the display visible regardless of the visor position which can change depending upon its use for blocking sun for which it is primarily designed. Thus, in visor displays embodying the present invention, the visor body includes a window to which a display is movably mounted such that the display, when the visor is in one of a raised or lowered use position, is visible through the window and, when the visor is moved to the other of the raised or lowered positions, the display can be moved to be directly visible.

In a preferred embodiment of the invention, a visor display includes a display housing to which a display is mounted. Such housing is pivotally mounted to a visor body and movable from a closed position where the display is aligned with a window formed through the visor body to an open position where the display is visible when the visor window is adjacent the vehicle roof. In the preferred embodiment of the invention, the visor window was formed through a vanity mirror in an area of the vanity mirror which is otherwise covered with a reflective material to provide a mirror such that the display is viewed through the front surface of the mirror window. In another embodiment of the invention also, a visor body includes a housing which extends to opposite sides of the visor and presents a display on such opposite sides to be visible regardless of the visor position.

With the present invention, therefore, a single display, such as vacuum florescent display, can be employed and viewed through an illuminated vanity mirror with sufficient contrast to readily view the display with the visor in a lowered use position with the vanity mirror in use. The display is equally visible when the visor is in a raised stored position by pivoting the display housing downwardly to a position for direct viewing.

These an other features, objects and advantages of the present invention will become apparent upon reading the following description thereof together with reference to the accompanying drawings.

BRIEF DESCRIPTION OF THE DRAWINGS

FIG. 4 is a rear perspective view of the visor shown in FIGS. 1–3 with the display housing pivoted to a lowered position showing the display window formed through the visor;

FIG. 5 is a front perspective view of the visor of FIGS. 1–4 shown in a lowered use position with the vanity mirror cover in an open position;

FIG. 6 is an enlarged fragmentary, front elevational view of the visor display shown in FIG. 5, showing the display information thereon;

FIG. 7 is an enlarged fragmentary cross-section view of the visor display taken along section line VII—VII of FIG. 6;

FIG. 8 is a front elevational view of the visor shown in a lowered use position with the mirror cover in a closed position;

FIG. 9 is an electrical circuit diagram in block form of the display system;

FIG. 10 is a fragmentary, perspective view of a vehicle interior showing an alternative visor display with the visor in a lowered use position;

FIG. 11 is a fragmentary, perspective view of the visor display shown in FIG. 10, shown with the visor in a raised stored position against the vehicle headliner; and FIG. 12 is a enlarged fragmentary, cross-sectional view taken along section XII—XII of FIG. 11.

DETAILED DESCRIPTION OF THE PREFERRED EMBODIMENT

Figure 1:
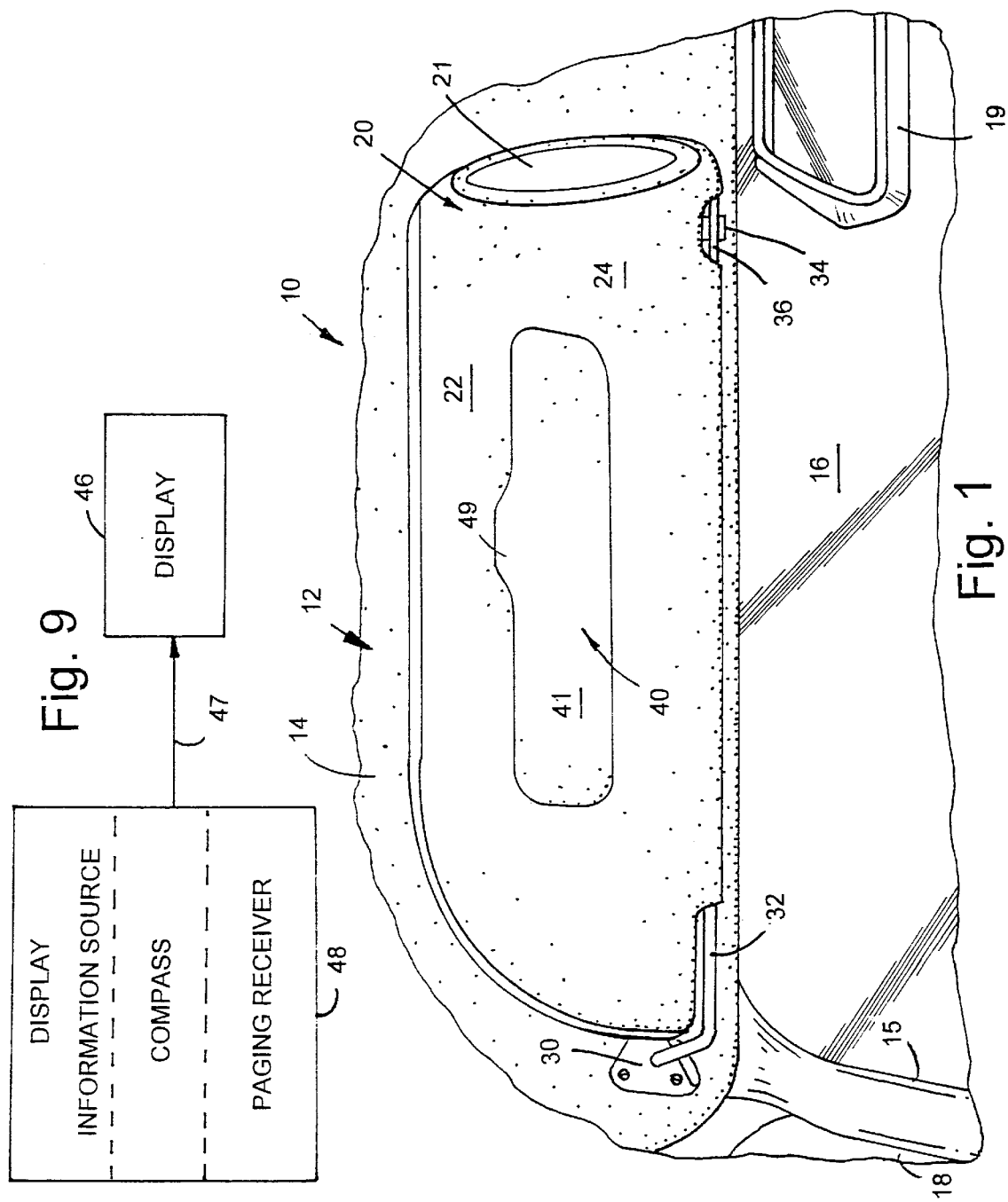
FIG. 1 is a fragmentary, perspective view of a vehicle including a visor embodying the system of the present invention.

Referring initially to FIG. 1, there is shown a vehicle 10, such as an automobile, which includes a roof 12 of sheet-metal construction to which a molded composite headliner 14 is mounted for providing an attractive vehicle interior. Several pillars including an A-pillar 15 provide support for the roof 12. Pillar 15 divides the windshield 16 from the driver's side window 18 of the vehicle. The vehicle typically will include a rearview mirror assembly 19 and a pair of visor assemblies with the driver's side visor 20 incorporating the present invention being shown.

Visor assembly 20 comprises a visor body which can be of a molded polymeric material such as polypropylene or other material such as fiberboard which can be preformed in a butterfly shape and folded over in a clam-shell design to complete the visor body construction. The visor body is mounted to the vehicle roof 12 by means of an elbow bracket assembly 30 which can be of conventional construction and includes a pivot rod 32 extending into the body of the visor. A torque fitting (not shown) mounted within the visor body engages the pivot rod 32 for allowing the visor to be held in a raised stored position as illustrated in FIG. 1 to a lowered sun blocking use position as illustrated in FIGS. 5 and 8. The bracket assembly also allows the visor to be moved from the front windshield position to a side window position in a conventional manner. A remote support clip 34 may be mounted to the roof near the rearview mirror 19 and receive auxiliary visor rod 36 for supporting the end of the visor body remote from the bracket assembly 30 to the vehicle roof as illustrated in FIG. 1. The visor body may also include a pocket for receiving a slide-out auxiliary visor panel 21 as illustrated in FIGS. 1 and 2 for extending the effective width of the visor when in use.

For purposes of discussing the invention, the rear-facing surface 24 of visor 20, when in the raised stored position shown in FIG. 1, will be referred to as the rear of the visor with the opposite side of the visor being referred to as the front 22 of the visor. Formed in the rear 24 of the visor body is a pocket 26 as best seen in FIGS. 2 and 4 for storing a movably mounted display assembly 40 therein. Display assembly 40 includes a housing 42 which is pivotally mounted to the visor body on an edge of pocket 26 formed therein by means of a conventional pivot axle assembly 44 to be moved from a stored position substantially flush with the rear surface 24 of visor 20 as seen in FIG. 1, with the outer surface 41 of display assembly 40 being textured with an upholstery material to conform to that of the visor. The inner surface of housing 40 includes a polymeric panel 43 having an elongated rectangular window 45 (FIG. 2A) formed therein behind which there is mounted a digital display 46 which is electrically coupled to a display information source 48 (FIG. 9) by means of suitable conductors 47 extending through the visor body and the hollow pivot rod 32 to the electrical circuit comprising the display information source 48. The display information source 48 may be, for example, a digital compass such as disclosed in U.S. Pat. No. 4,953,305, the disclosure of which is incorporated herein by reference; a paging receiver as disclosed in U.S. Pat. No. 5,479,157 the disclosure of which is incorporated herein by reference; or other vehicle information such as disclosed in U.S. Pat. No. 5,555,172, entitled VEHICLE DATA ENTRY SYSTEM, which is assigned to the present assignee and the disclosure of which is incorporated herein by reference.

Figure 2:
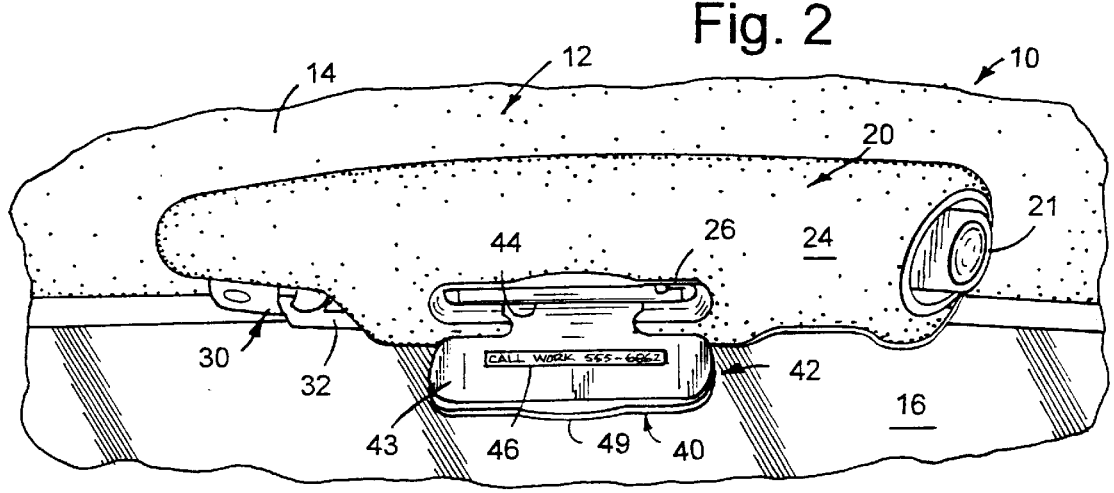
FIG. 2 is a perspective view of the visor shown in FIG. 1, shown with a display housing in a lowered use position.
Figure 2A:
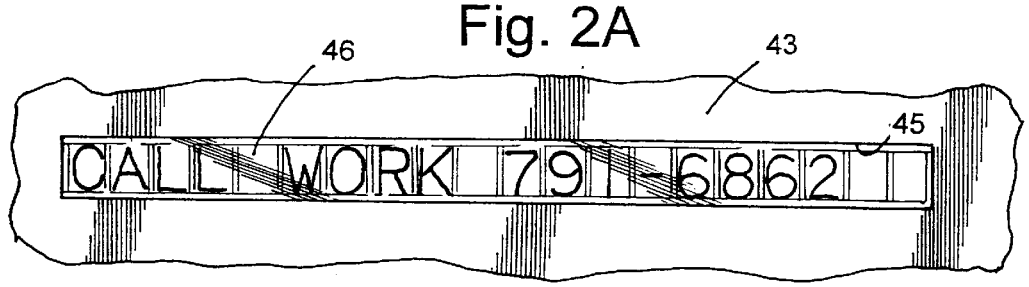
FIG. 2A is an enlarged fragmentary view of the display shown in FIG. 2.

For purposes of pivoting the display assembly 40 from its stored, concealed position shown in FIG. 1 to its lowered use position as shown in FIG. 2, a handle 49 is provided along the upper edge of the display. Display 46 can be any number of commercially available digital displays such as a vacuum florescent display, an LCD display, an LED display or the like which provide an alpha-numeric or other suitable display of information to be displayed to the driver. It is conventionally mounted within the hollow body of housing 42 in alignment with window 45 such that information to be displayed is visible through the window.

Figure 3:
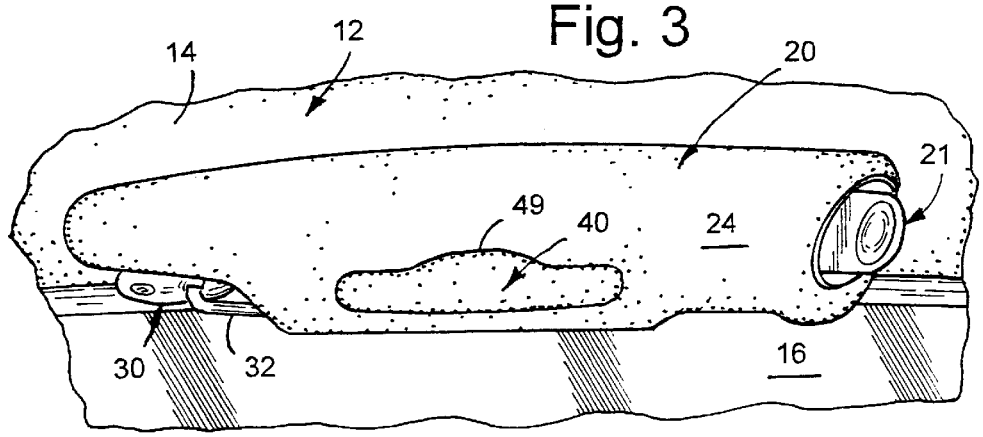
FIG. 3 is a fragmentary, perspective view of the visor shown in FIG. 2 with the display housing in a stored position.

The visor pocket 26 includes, as best seen in FIG. 4, a rear panel 50 also having a rectangular window 52 extending therethrough and which is aligned with the display 46 when the display assembly 40 is in its stored position, as seen in FIGS. 1 and 3. In one embodiment of the invention, the window 52 extends entirely through the visor body and is exposed on the front surface 22 such that when the visor is in its lowered use position, the display can be viewed through the window 52 in panel 50 of the visor. In the preferred embodiment of the invention, however, the front surface 22 of the visor includes an illuminated vanity mirror assembly 60, as seen in FIGS. 5–8. Vanity mirror assembly 60 can be constructed generally as disclosed in U.S. Pat. No. 5,428,513, the disclosure of which is incorporated herein by reference, with a modification to provide a window through the mirror of the assembly such that the display 46 can be viewed through the mirror when in the position shown in FIGS. 5 and 6. A brief description of the visor assembly 60 follows.

Mirror assembly 60 includes a mirror frame 62 mounted to the visor body and including a mirror 64 mounted therein. Near the upper portion of the mirror, there is formed a generally rectangular window 66 of a shape substantially conforming to and aligned with window 52 in panel 50 (FIG. 4). Window 66 is formed, as best seen in FIG. 7, on the rear surface of mirror 64 by not coating the rectangular area of the rear surface of the mirror glass 61 with the normal reflective coating 63. Alternatively, this coating 63 could be removed to define window 66. Thus, the area defining window 66 provides clear glass 61 which is aligned with the display 46 mounted in display housing 40, as seen in FIG. 7. Therefore, the display assembly 40, when in the position shown in FIGS. 1 and 3, is within the pocket 26 in the rear surface 24 of visor 20, and information displayed by display 46 is visible through the window 66 in mirror 64, and window 52 in rear panel 50 form through the visor body. FIG. 6 illustrates how the information on display 46 appears through the mirror window. The mirror assembly 60 also includes a cover 68 which can be selectively moved from a closed position as shown in FIG. 8 to the open position shown in FIGS. 5 and 6 for exposure of the mirror 64 and display 46 therethrough. Illumination means 69 is mounted on the inside of cover 68. The intensity of the illumination can be controlled by a variable resistance control 65 mounted to the frame 62 of the illuminated vanity mirror assembly.

The pocket 26 into which the display assembly 40 is pivotally mounted provides light shielding for the display 46 such that it is readily visible through the front surface of mirror 64 even when the illumination means 69 are in the high brightness position. The display is recessed in the darkened area of pocket 26 behind the reflective surface 52 of the mirror 64. Thus, with the system of the preferred embodiment of the invention, a single display 46 is viewable either with the, visor in a raised stored position, as illustrated in FIG. 2, or when in a lowered position with the vanity mirror exposed, as seen in FIGS. 5 and 6. In some embodiments, the vanity mirror will not have a cover so that the display is visible at all times instead of selectively as in the embodiment shown including a vanity mirror cover 68.

In the alternative embodiment shown in FIGS. 10–12, the same vehicle 10 is shown with corresponding parts bearing the same reference numerals as in the previous embodiment. The vehicle includes a pair of visors 70, 80 on the driver and passenger sides, respectively. The driver's side visor 70 includes a dual display assembly 90 (FIG. 12) which includes a first display 92 which is visible when the visor is in a lowered position as seen in FIG. 10 and a second display 94 mounted to the visor to be visible and readable when the visor is in a raised stored position as shown in FIG. 11. Displays 92 and 94 can be commonly coupled to the source of display information 48 (FIG. 9) via conductors 47. Displays 92 and 94 are mounted in a housing 96 which includes a front bezel 95 surrounding and receiving display 92 and an angled bezel 97. Bezel 97 positions the face of display 94 to extend at an acute angle of approximately 45° to the planar surface 71 of visor 70 such that when the visor is in a raised stored position, as illustrated in FIG. 12, the display is readily visible by the vehicle driver. Housing 96 is shaped to fit within an aperture 74 in the visor body. Displays 92 and 94 are positioned preferably in one corner of the visor which may include an illuminated vanity mirror package in the center area if desired. Displays 92 and 94 may be of the same general type as display 46. In some embodiments, the dual display can be provided utilizing a single display source located within housing 90 and suitable prismatic reflectors to provide the display surfaces 92, 94. The visor display system of FIGS. 10–12, therefore, also provides a display on opposite sides of the visor, such that the information is readily visible and accessible to the driver regardless of the operational position of the visor.

It will become apparent to those skilled in the art that various modifications to the preferred embodiments of the invention as described herein can be made without departing from the spirit or scope of the invention as defined by the appended claims.

The embodiments of the invention in which an exclusive property or privilege is claimed are defined as follows:

1. A visor including an electrical display for displaying information to an occupant of the vehicle, said visor comprising:

a visor including a generally planar visor body;

a window extending through said visor body; and a display housing including an electrical display, said housing movably mounted to said visor body to be movable between a position aligned with said window in which said display is visible through said window when said visor is in a first position and a position remote from said visor body where said display is visible when said visor is moved to a second position such that said display can be seen regardless of the visor position, wherein said visor has a pocket formed in one side of said visor body in alignment with said window and said display housing is movable into said pocket to be aligned with said window.

2. The visor display as defined in claim 1 and further including a mirror mounted to said visor body on a side opposite said display housing and wherein said window includes a clear area of said mirror such that said display can be seen through said clear area of said mirror.

3. A visor display comprising:

a visor body including a front side and a rear side;

a pocket formed in one of said sides and communicating with a window extending through the opposite side; and a display housing movably mounted to said visor pocket to be movable between a position within said pocket in which said display is visible through said window from said opposite side of said visor and a position remote from said pocket where said display is visible from said one side of said visor, such that said display can be seen regardless of the visor position.

4. The visor display as defined in claim 3 wherein said pocket is formed in said rear side of said visor body.

5. The visor display as defined in claim 4 and further including a vanity mirror mounted to said front side of said visor body, said mirror having a window area formed thereon aligned with said display when in said pocket such that information can be viewed through said mirror.

6. The visor display as defined in claim 4 wherein said visor body includes a cover for selectively covering said mirror.

7. The visor display as defined in claim 5 and further including illumination means for said mirror.

8. A visor display for a vehicle comprising:

a visor including a generally planar visor body having a front side and a rear side;

a bracket for mounting said visor to a vehicle for movement between a raised stored position exposing said rear of said visor to the interior of a vehicle and a lowered sun-blocking position exposing said front of said visor to the interior of a vehicle; and a display housing mounted to said visor body and including an electrical display therein presenting a display which is visible from said front and rear sides of said visor such that display information can be viewed when said visor is in a raised stored position and in a lowered sun-blocking position, wherein said visor includes an aperture therethrough and said housing is movably mounted to said aperture such that said display can be viewed through said aperture when in a first position and directly when moved from said aperture, and wherein said aperture defines a pocket formed in one of said sides and extends through said visor body to define a window and wherein said display housing is pivotally movable into said pocket to be aligned with said window.

9. The visor display as defined in claim 8 and further including a mirror mounted to said visor body on a side opposite said display housing, said mirror having a clear window aligned with said window in said visor body.

10. The visor display as defined in claim 9 wherein said bezel on said rear of said visor body extends from the plane of said visor body at an acute angle.

11. A visor display for a vehicle comprising:

a visor including a generally planar visor body having a front side and a rear side;

a bracket for mounting said visor to a vehicle for movement between a raised stored position exposing said rear of said visor to the interior of a vehicle and a lowered sun-blocking position exposing said front of said visor to the interior of a vehicle;

a window formed through said visor body; and a display housing mounted to said visor body and including an electrical display therein presenting a display which is visible through said window from at least one of said front and rear sides of said visor and directly from the other of said front and rear sides such that display information can be viewed when said visor is in a raised stored position and a lowered sun-blocking position, wherein said visor body includes a pocket formed in one of said sides and communicating with said window, and wherein said display housing is movably mounted to said visor pocket to be movable between a position within said pocket in which said display is visible through said window from said opposite side of said visor and a position remote from said pocket where said display is visible from said one side of said visor, such that said display can be seen regardless of the visor position.

12. The visor display as defined in claim 11 and further including a vanity mirror mounted to said front side of said visor body, said mirror having a window area formed thereon aligned with said display when in said pocket such that information can be viewed through said mirror.

13. The visor display as defined in claim 12 wherein said visor body includes a cover for selectively covering said mirror.

14. The visor display as defined in claim 13 and further including illumination means for said mirror.

* * * * *